US012750795B2

(12) United States Patent
Ajami et al.

(10) Patent No.: US 12,750,795 B2
(45) Date of Patent: Sep. 29, 2026

(54) RELIABLE ENCODING AND DECODING OF PARTIAL TIME SYNCHRONIZATION FUNCTION SIGNALING

(71) Applicant: QUALCOMM Incorporated, San Diego, CA (US)

(72) Inventors: Abdel Karim Ajami, Lakeside, CA (US); Sai Yiu Duncan Ho, San Diego, CA (US); Alfred Asterjadhi, San Diego, CA (US); George Cherian, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 18/051,515

(22) Filed: Oct. 31, 2022

(65) Prior Publication Data

US 2024/0147390 A1 May 2, 2024

(51) Int. Cl.
*H04W 56/00* (2009.01)

(52) U.S. Cl.
CPC ................................. *H04W 56/001* (2013.01)

(58) Field of Classification Search
CPC ............. H04W 84/12; H04W 52/0216; H04W 56/001; H04L 67/145
See application file for complete search history.

(56) References Cited

U.S. PATENT DOCUMENTS

| | | | | |
|---|---|---|---|---|
| 11,153,824 | B1 * | 10/2021 | Jia | H04W 52/0229 |
| 11,553,522 | B1 * | 1/2023 | Shukla | H04W 74/002 |
| 2015/0036670 | A1 | 2/2015 | Park | |
| 2018/0310245 | A1 * | 10/2018 | Ouchi | H04W 52/0238 |
| 2019/0021055 | A1 * | 1/2019 | Guo | H04L 43/10 |
| 2019/0253967 | A1 * | 8/2019 | Xiao | H04W 28/0284 |
| 2020/0221381 | A1 * | 7/2020 | Homchaudhuri | H04W 52/0235 |
| 2020/0267644 | A1 * | 8/2020 | Rajib | H04W 52/0216 |

(Continued)

FOREIGN PATENT DOCUMENTS

WO 2019227869 A1 12/2019

OTHER PUBLICATIONS

Asterjadhi A (Qualcomm Inc)., et al., "MAC-CR-27-7-6", IEEE Draft, 11-18-1469-00-00AX-MAC-CR-27-7-6, IEEE-SA Mentor, Piscataway, NJ, USA, vol. 802.11ax, Sep. 5, 2018, pp. 1-3, XP068128733, Section 27.7.6.

(Continued)

*Primary Examiner* — Yee F Lam
(74) *Attorney, Agent, or Firm* — Patterson + Sheridan, L.L.P.

(57) ABSTRACT

Certain aspects of the present disclosure provide techniques for wireless communication by a station generally including obtaining a frame that includes a partial representation of a target time value, wherein the target time value is based on a portion of a current time synchronization function (TSF) value associated with when the frame was obtained, adjusting the portion of the current TSF value if a recovered value for the target time value represents a time in the past, and recovering the target time value based on the partial representation of the target time value and the adjusted portion of the current TSF value.

19 Claims, 15 Drawing Sheets

(56) References Cited

U.S. PATENT DOCUMENTS

| | | | | |
|---|---|---|---|---|
| 2022/0141770 | A1* | 5/2022 | Ahn | H04W 52/0229 370/318 |
| 2022/0182931 | A1* | 6/2022 | Jia | H04W 28/0273 |
| 2022/0272566 | A1 | 8/2022 | Nayak et al. | |
| 2022/0272631 | A1 | 8/2022 | Ouchi | |
| 2023/0026249 | A1* | 1/2023 | Chu | H04W 28/0268 |
| 2023/0128915 | A1* | 4/2023 | Kim | H04L 1/1896 370/329 |
| 2023/0164709 | A1* | 5/2023 | Ajami | H04W 56/0015 370/350 |
| 2024/0049285 | A1* | 2/2024 | Kim | H04W 74/0816 |
| 2024/0080761 | A1* | 3/2024 | Shafin | H04W 52/0216 |

OTHER PUBLICATIONS

International Search Report and Written Opinion—PCT/US2023/077013—ISA/EPO—May 15, 2024.

Partial International Search Report—PCT/US2023/077013—ISA/EPO—Feb. 7, 2024.

* cited by examiner

800

RELIABLE ENCODING AND DECODING OF PARTIAL TIME SYNCHRONIZATION FUNCTION SIGNALING

BACKGROUND

Field of the Disclosure

Aspects of the present disclosure relate to wireless communications, and more particularly, to techniques for aligning target wake up times (TWTs) between an access point (AP) and station (STA).

Description of Related Art

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a method for wireless communication by a station. The method includes obtaining a frame that includes a partial representation of a target time value, wherein the target time value is based on a portion of a current time synchronization function (TSF) value associated with when the frame was obtained; adjusting the portion of the current TSF value if a recovered value for the target time value represents a time in the past; and recovering the target time value based on the partial representation of the target time value and the adjusted portion of the current TSF value.

Another aspect provides a method for wireless communication by an access point. The method includes setting a value in a field to indicate a next target wakeup time (TWT) based on a channel access time; and outputting a frame for transmission with the field.

Another aspect provides a method for wireless communication by a station. The method includes calculating a next TWT based on a current TWT and a TWT wake interval; and adjusting the next TWT if a target beacon transmission time (TBTT) occurs between the current TWT and the calculated next TWT.

Another aspect provides a method for wireless communication by an access point. The method includes calculating a next TWT based on a current TWT and a TWT wake interval; adjusting the next TWT if a TBTT occurs between the current TWT and the calculated next TWT; and outputting, for transmission at the TBTT, a beacon indicating the adjusted next TWT.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
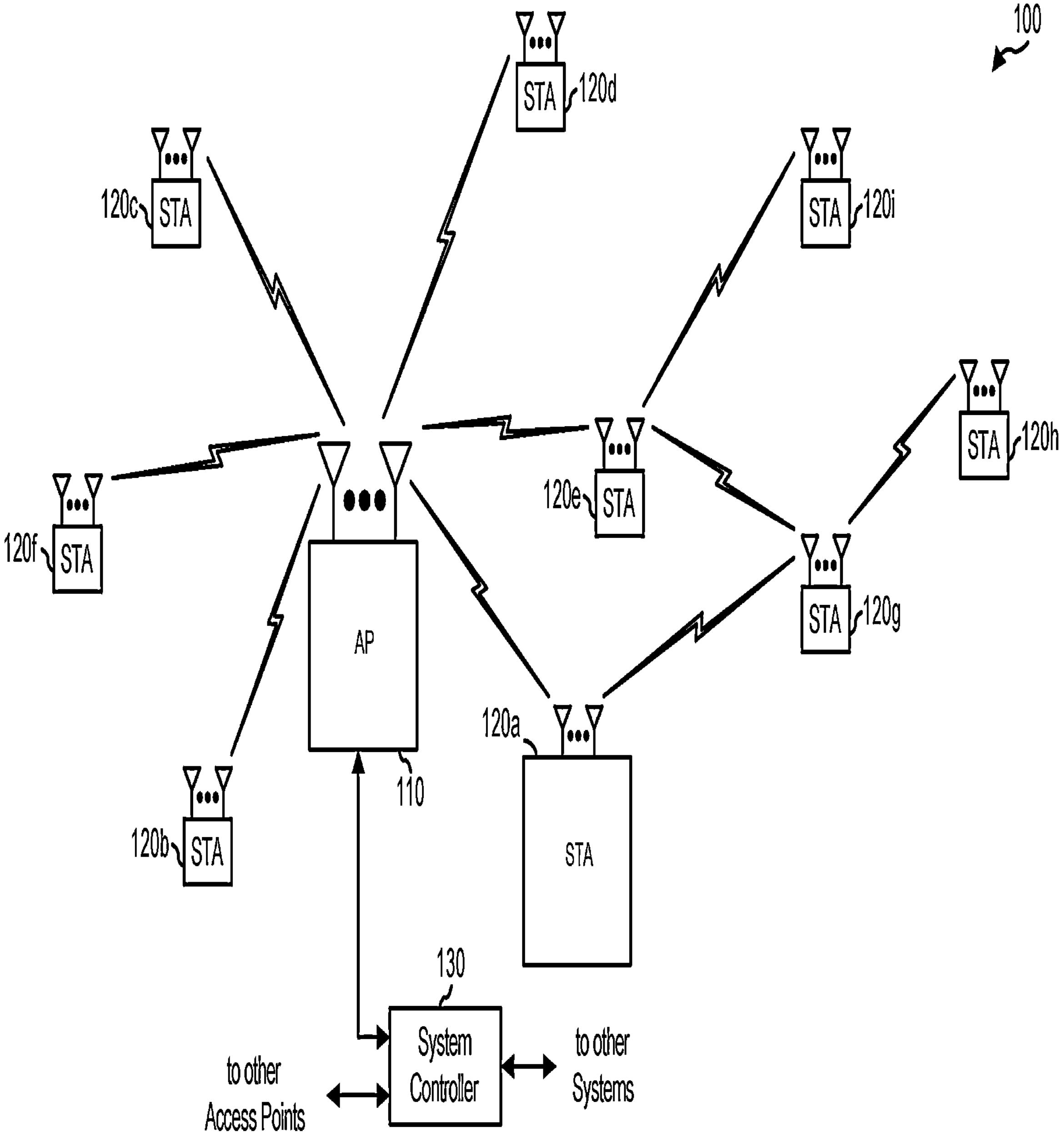
FIG. 1 depicts an example wireless communications network.

Aspects of the present disclosure provide apparatuses, methods, processing systems, and computer-readable mediums for aligning target wake up times (TWTs) between an access point (AP) and station (STA).

In wireless communications systems, a Target Wake Time (TWT) generally refers to a mechanism that may help reduce power consumption and improve resource efficiency by enabling wireless stations to stay in a low power state and wake at specified times (TWTs) in order to send or receive data. TWTs can help an AP coordinate access to a wireless medium by different stations (STAs), allowing high quality of service with reduced contention or overlap and increased device sleep time to reduce power consumption and extend battery life. Examples of TWT signaling include restricted TWT (R-TWT) signaling and broadcast TWT (b-TWT) signaling.

R-TWT signaling extends TWT signaling and functionality, potentially providing predictable latency for latency sensitive traffic for applications such as extended reality (XR) and Cloud Gaming (CG). R-TWT rules generally restrict access to the medium during an R-TWT service period (SP) by requiring that a STA end its transmit opportunity (TXOP) before the start time of an R-TWT SP. This allows members of the R-TWT SP to access the medium timely and deliver the latency sensitive traffic.

One potential limitation of TWT signaling (e.g., R-TWT and B-TWT signaling), however, is that reliance on partial timing synchronization function (TSF) encoding. TSF generally refers to a mechanism, specified in IEEE 802.11, to achieve timing synchronization among users. A TSF keeps the timers for all stations in a same basic service set (BSS) synchronized, because all such stations maintain a local TSF timer, with a modulus $2^{64}$ counting in increments of microseconds. In other words, the TSF timer has a 64 bit value. Timing synchronization is achieved by stations periodically exchanging timing information through beacon frames.

Partial TSF encoding refers to the signaling of only a portion of the TSF timer bits to indicate a time value for certain values, such as a next TWT. For example, with partial TSF encoding, only bits 10-25 are included in a TWT field. A receiving station determines the value of the next TWT by assuming bits 0 to 9 (B0-B9) are zero and bits 26 to 63 (B26-B63) are equal to the same value as the respective bits in the current value of the locally-maintained TSF timer. Thus, the TSF Timer at which a next TWT is scheduled may be determined, at a receiving station, as follows:

Next TWT={Current_TSF[B63:B26]||TWT[15:0]||0000000000}, where "||" refers to the concatenation operator.

The reason for partial TSF encoding is to reduce the size of the beacon frame and keep the beacon payload from becoming bloated. Partial TSF encoding, however, impacts the granularity of TWT scheduling, as the bottom 10 bits being assumed zero results in a granularity of 1024 us ($2^{10}$ us) and creates potential decoding issues at the receiving STA. The potential decoding issue may be described as follows. Based on the equation above, when the current TSF at which the TWT element is received has a value less than $2^{26}$-1, but the TSF Timer corresponding to the next TWT leads to a value greater than $2^{26}$-1, then the changes in the values of the bits B26-B63 of the TSF value will not be reflected in the TWT element. This is because the TSF timer value for the TWT recovered at the STA will be a value in the past (since it assumes bits B26-B63 of the current value of the TSF timer).

Aspects of the present disclosure, however, provide efficient solutions to encode and decode the partial TSF signaling which may help address the resolution and potential decoding issues described above. The techniques described herein may be applied to advantage in various types of signaling mechanisms that utilize partial TSF time encoding. The techniques described herein may help ensure an AP and STA are aligned regarding a next TWT time and may help provide scheduling flexibility, which may improve overall system performance.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications System

FIG. 1 is a diagram illustrating an example wireless communication system 100, in accordance with certain aspects of the present disclosure. System 100 may be a multiple-input multiple-output (MIMO)/multi-link operation (MLO) system 100. As shown in FIG. 1, an access point (AP) 110 includes an association manager 112 that may be configured to take one or more actions described herein. The wireless station (STA) 120*a* includes an association manager 122 that may be configured to take one or more actions described herein. In aspects, AP 110 and wireless station 120*a* may be MLDs as further described herein with respect to FIG. 3.

For simplicity, only one AP 110 is shown in FIG. 1. An AP is generally a fixed station that communicates with the wireless STAs and may also be referred to as a base station (B S) or some other terminology. A wireless STA may be fixed or mobile and may also be referred to as a mobile STA, a wireless device, or some other terminology. AP 110 may communicate with one or more wireless STAs 120 at any given moment on the downlink (DL) and/or uplink (UL). The DL (i.e., forward link) is the communication link from AP 110 to the wireless STAs 120, and the UL (i.e., reverse link) is the communication link from the wireless STAs 120 to AP 110. A wireless STA 120 may also communicate peer-to-peer with another wireless STA 120, for example, via a direct link such as a tunneled direct link setup (TDLS). A system controller 130 may be in communication with and provide coordination and control for the access points.

While portions of the following disclosure will describe wireless STAs 120 capable of communicating via Spatial Division Multiple Access (SDMA), for certain aspects, the wireless STAs 120 may also include some wireless STAs 120 that do not support SDMA. Thus, for such aspects, an AP 110 may be configured to communicate with both SDMA and non-SDMA wireless STAs 120. This approach may conveniently allow older versions of wireless STAs 120 ("legacy" stations) to remain deployed in an enterprise, extending their useful lifetime, while allowing newer SDMA wireless STAs 120 to be introduced as deemed appropriate.

System 100 employs multiple transmit and multiple receive antennas for data transmission on the DL and UL. AP 110 is equipped with $N_{ap}$ antennas and represents the multiple-input (MI) for DL transmissions and the multiple-output (MO) for UL transmissions. A set of K selected wireless stations 120 collectively represents the multiple-output for DL transmissions and the multiple-input for UL transmissions. For pure SDMA, it is desired to have $N_{ap} \geq K \geq 1$ if the data symbol streams for the K wireless STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected wireless STA transmits user-specific data to and/or receives user-specific data from the access point. In general, each selected wireless STA may be equipped with one or multiple antennas (i.e., $N_{sta} \geq 1$). The K selected wireless STAs can have the same or different number of antennas.

System 100 may be a time division duplex (TDD) system or a frequency division duplex (FDD) system. For a TDD system, the DL and UL share the same frequency band. For an FDD system, the DL and UL use different frequency bands. System 100 may also utilize a single carrier or multiple carriers for transmission. Each wireless STA may be equipped with a single antenna or multiple antennas. System 100 may also be a TDMA system if wireless STAs 120 share the same frequency channel by dividing transmission/reception into different time slots, each time slot being assigned to a different wireless STA 120.

Figure 2:
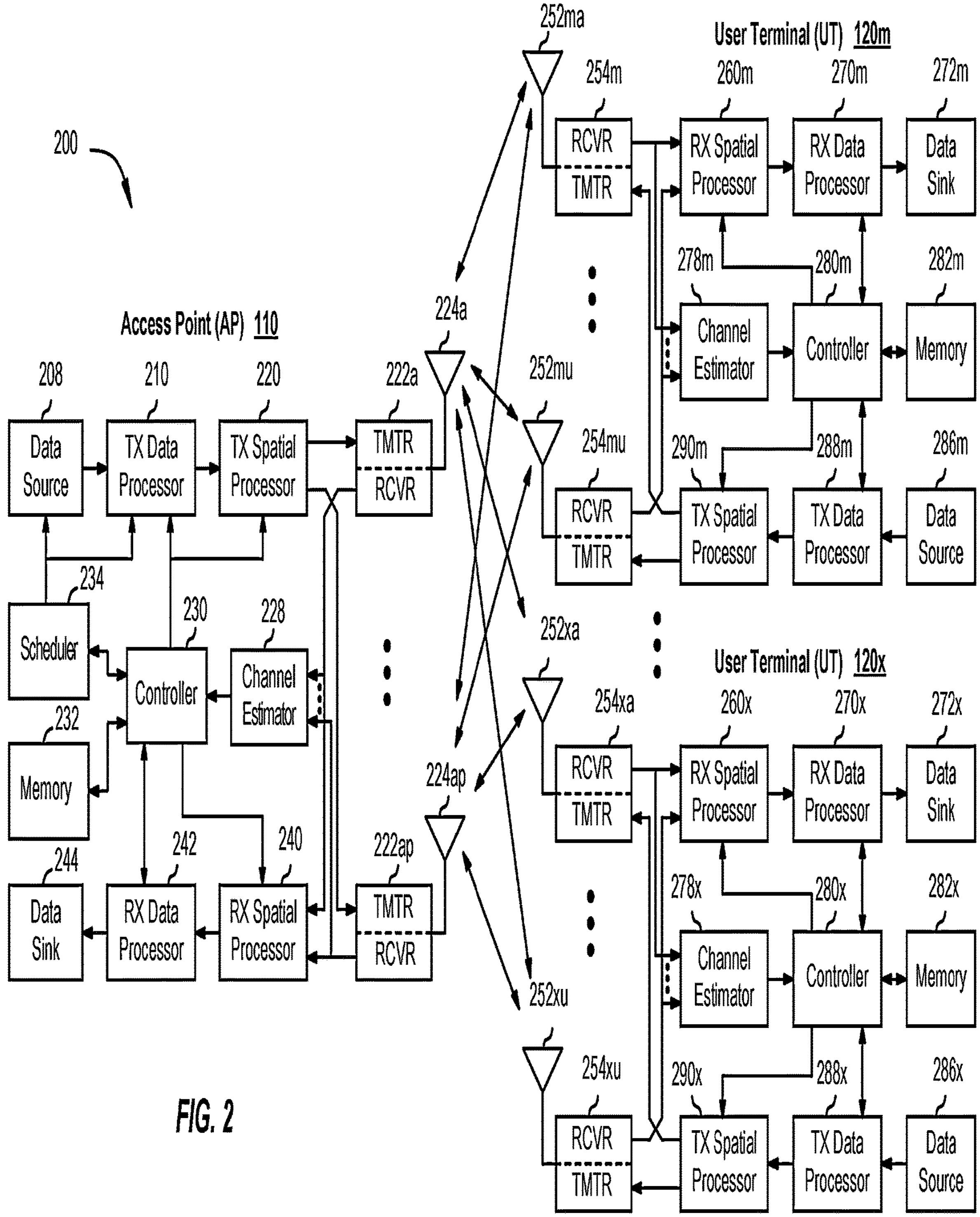
FIG. 2 depicts an example disaggregated base station architecture.

FIG. 2 illustrates a block diagram of AP 110 and two wireless STAs 120*m* and 120*x* in a MIMO/MLO system, such as system 100, in accordance with certain aspects of the present disclosure. In certain aspects, AP 110 and/or wireless STAs 120*m* and 120*x* may perform various techniques to ensure that a non-AP MLD is able to receive a group addressed frame. For example, AP 110 and/or wireless STAs 120*m* and 120*x* may include a respective association manager as described herein with respect to FIG. 1.

AP 110 is equipped with $N_{ap}$ antennas 224*a* through 224*t*. Wireless STA 120*m* is equipped with $N_{sta,m}$ antennas 252*ma* through 252*mu*, and wireless STA 120*x* is equipped with $N_{sta,x}$ antennas 252*xa* through 252*xu*. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224*a* through 224*ap* receive the UL signals from all NUI, wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Aspects Related to Synchronization of Target Wake Up Times

Restricted TWTs (R-TWTs) potentially provide predictable latency for latency sensitive traffic, such as extended reality (XR) and Cloud Gaming (CG) traffic, by restricting access to the medium during an R-TWT service period (SP). General R-TWT SP rules require that a STA end its transmit opportunity (TXOP) before the start time of an R-TWT SP. This allows members of the R-TWT SP to access the medium timely and deliver the latency sensitive traffic.

Figure 3:
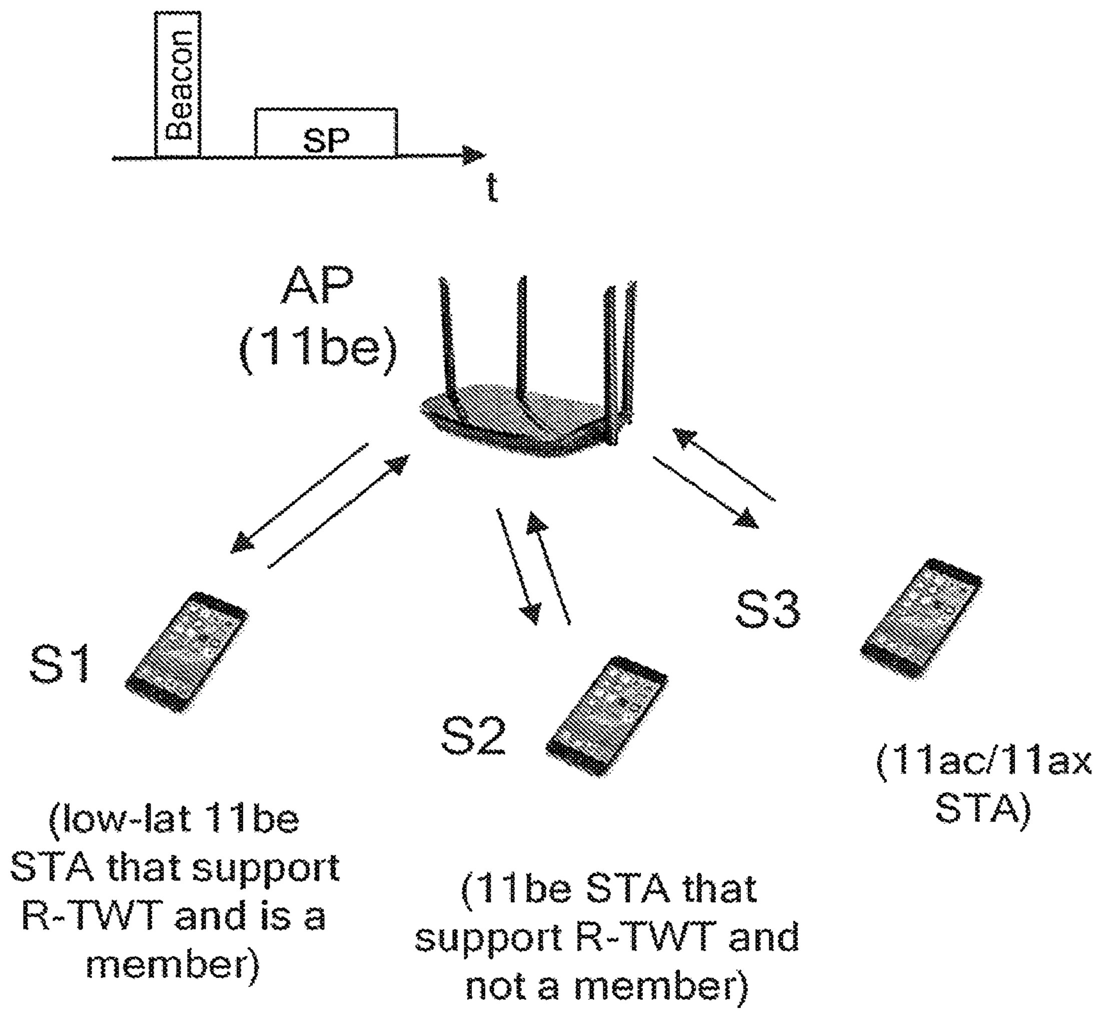
FIG. 3 and FIG. 4 depict example communications between an access point (AP) and wireless stations (STAs).

The R-TWT mechanism may be understood with reference to the example scenario shown in FIG. 3, in which an access point (AP) communicates with several stations (STAs) S1, S2, and S3. The example assumes that the AP (e.g., an 802.11 be AP) supports R-TWT, S1 (e.g., a low latency 802.11 be STA) supports R-TWT and is a member of an R-TWT schedule or R-TWT SP (meaning it may be able to access during an R-TWT SP), that S2 (e.g., an 802.11 be STA) supports R-TWT but is not a member of the R-TWT group, while S3 (e.g., an 802.11 ac/ax STA) does not support R-TWT. As illustrated in FIG. 3, the AP may transmit a beacon indicating an R-TWT service period (SP).

Figure 4:
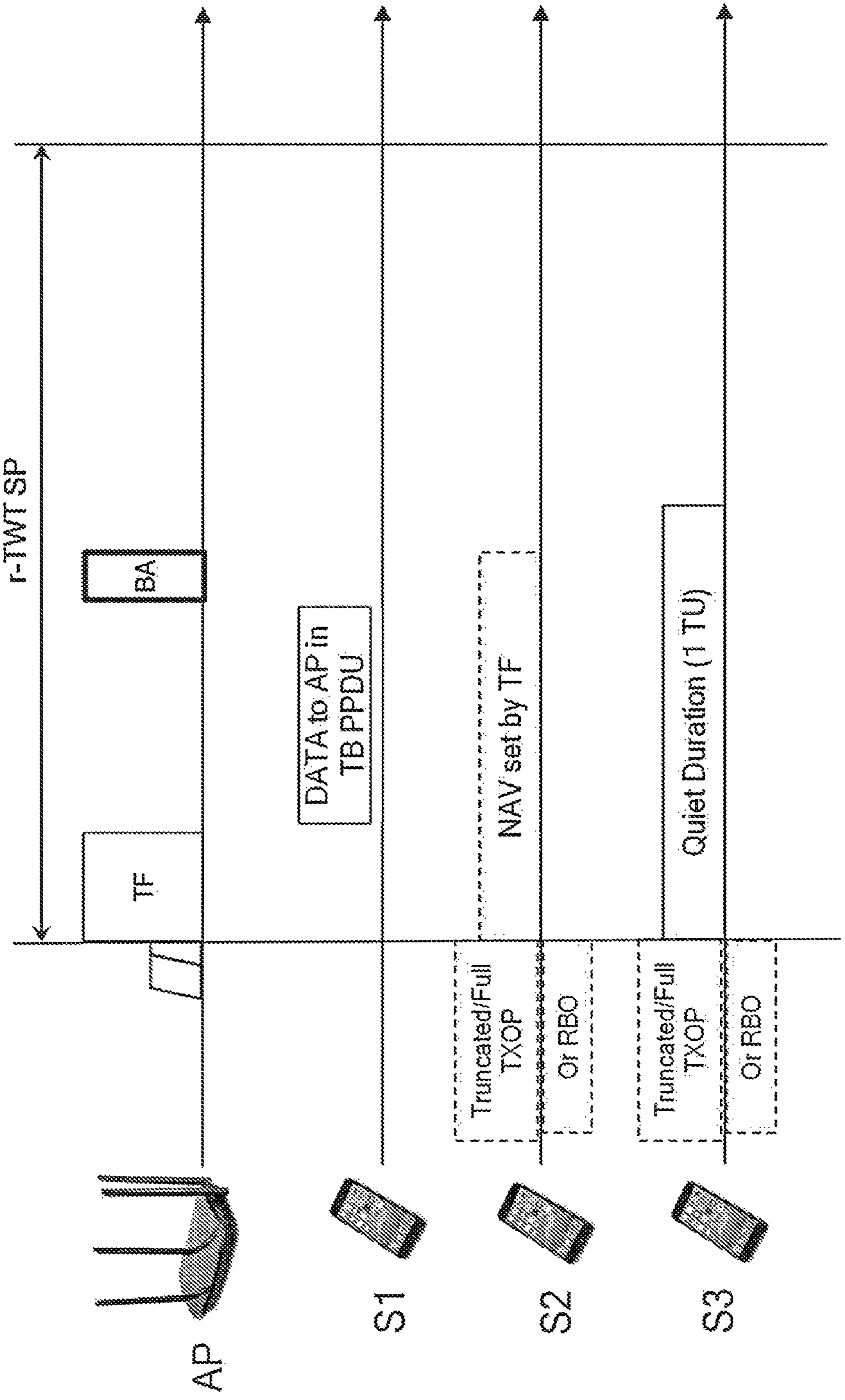

As shown in FIGS. 4, S2 and S3 may be configured to end their TXOPs early, before the start time of the R-TWT SP so that the AP or S1 can access the channel timely and deliver latency-sensitive traffic. That is, these STAs (S2 and S3) may truncate the TXOP. Some other STAs may set a network allocation vector (NAV) duration at the beginning of an R-TWT SP based on a quiet element or R-TWT SP start time as indicated by the TWT element for a duration of one time unit (TU), which may be scheduled by the AP in a beacon.

Figure 5:
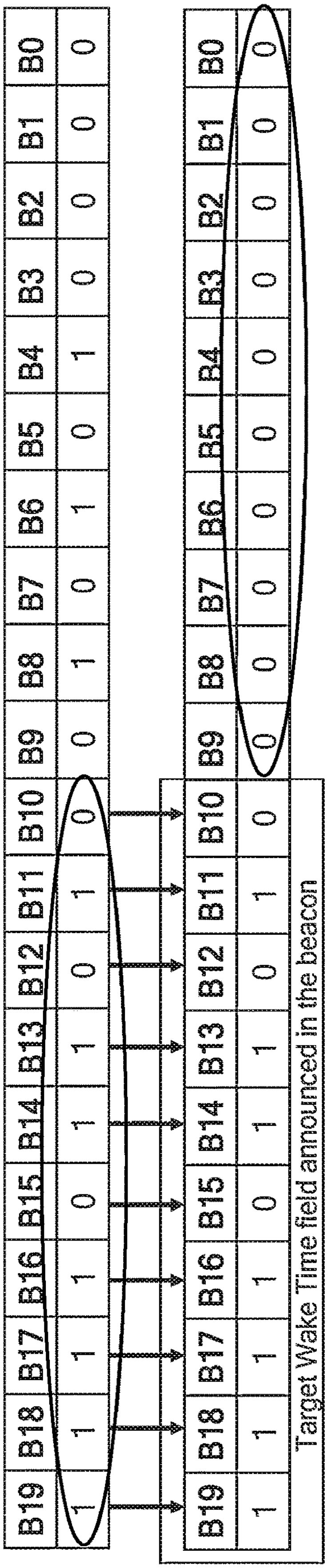
FIG. 5 depicts an example mapping of a Target Wake Time (TWT) field to a time synchronization function (TSF).

As noted above, resolution mismatch may occur between a target wakeup time (TWT) field and a corresponding time synchronization function (TSF). As illustrated in FIG. 5, for R-TWT, the TWT field (e.g., used to determine an R-TWT SP start time) in the TWT information element (IE) may be included in the TWT setup frame or announced in the beacon. As shown in the mapping illustrated in FIG. 5, the TWT IE is two octets with bit 0 of the two octets corresponding to (mapping to) bit 10 of the relevant TSF value. Thus, the relevant TSF for TWT is: $(1010000)_{10}$ μs= $(11110110100101010000)_2$.

Because bit 0 of the TWT field maps to bit 10 of the relevant TSF, the minimum resolution is 1024 microseconds ($2^{10}$). Therefore, if the TWT wake interval is not set to multiples of 1024 μs, then when the AP announces in the TWT element of the next beacon frame, the TWT Wake Interval will not be able to express values of the corresponding TWT start time that are less than 1024 μs.

As noted above, partial TSF encoding may create potential decoding issues at the receiving STA. The potential decoding issue is illustrated in the example shown in FIG. 6, in which a partial TSF may lead a STA to decode a next TWT whose TSF timer value occurs in the past.

Figure 6:
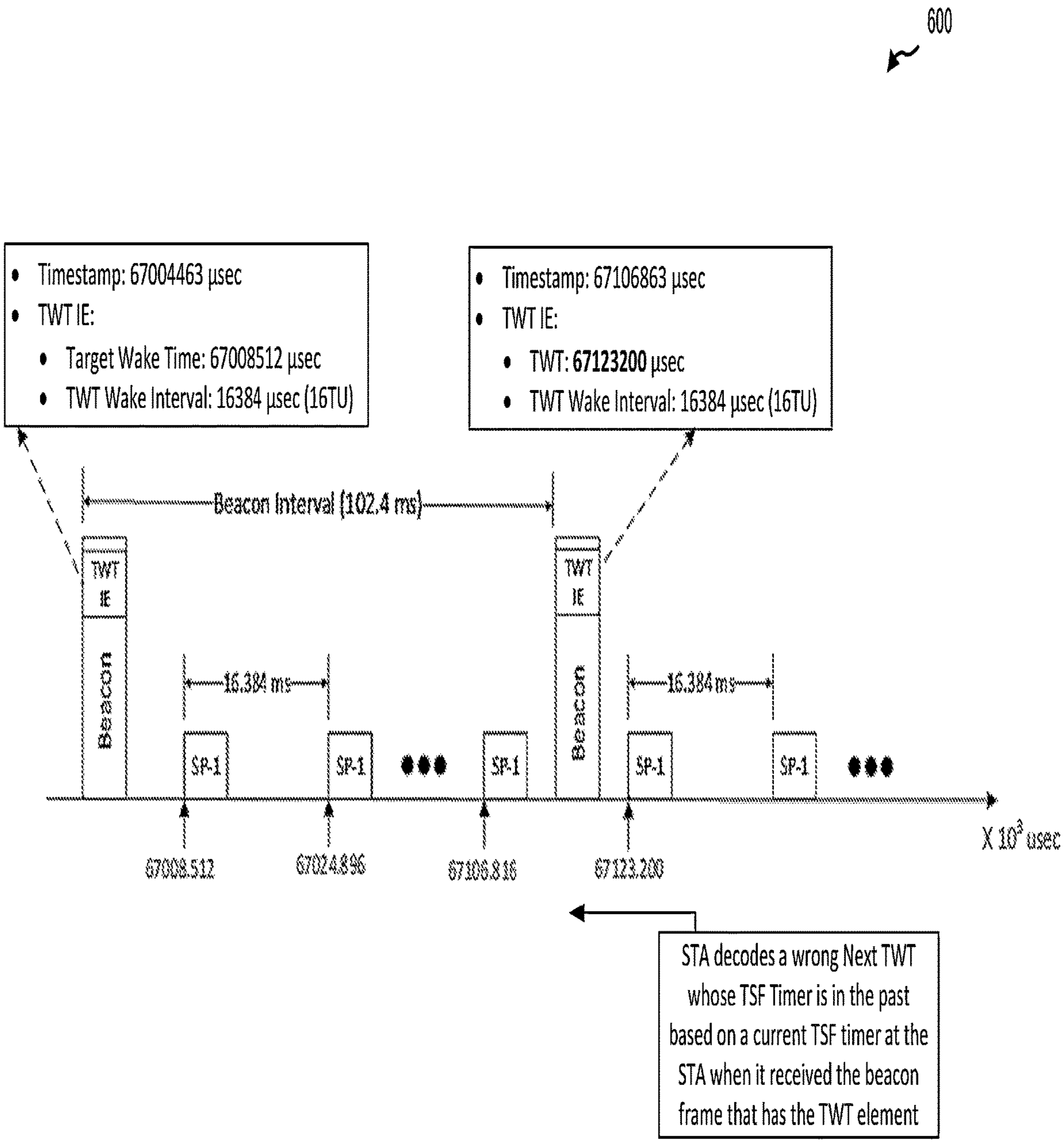
FIG. 6 depicts an example of a mismatch between a next TWT decoded by a station and an intended TWT announced by an access point (AP).

In the example illustrated in FIG. 6, an AP sends a beacon with a timestamp of:

67106833 μsec=>11111111111111100000101111 (26 bits);

The beacon carries a TWT IE intended to indicate a next TWT in the future, based on:

Next TWT: 67123200 μsec=>100000000000011100000000000.

However, this value is 27 bits, where the left most bit value of "1" is B26, which is not carried in the TWT field. Rather, due to partial TSF encoding, the AP inserts in the TWT field only bits B10-B25 (TSF[10:25] of the full 27-bit value) of the Next TWT value above (B10-B25=0000000000001110). As described above, applying conventional rules, a STA that receives the beacon would recover the TSF Timer of Next TWT using the current TSF (e.g., beacon timestamp) and TWT field as follows:

B63-26: 0 (based on current TSF timer at the STA when it received the beacon frame that has the TWT element);

TWT: 0000000000001110 (the partial TSF indicated in the TWT IE); and

B9-B0: 0000000000;

such that the recovered TSF Timer of Next TWT:

00000000000001110000000000=>14336 μsec, that occurs in the past, instead of the intended next TWT value of 67123200 μsec.

While aspects of the present disclosure refer to examples that apply to TWT signaling (e.g., R-TWTs and B-TWTs), partial TSF encoding issues potentially impact other signaling mechanisms, such as stream classification service (SCS) frames. Aspects of the present disclosure may also apply to any other timing signaling indicated in a MAC frame header (e.g., variants of a high throughput HT Control field that may include an A-Control subfield). The techniques described herein may apply to all such signaling mechanisms.

As demonstrated by the example shown in the timeline 600 of FIG. 6, when the current TSF at which the TWT element is received has a value less than $2^{26}$-1, but the TSF Timer corresponding to the next TWT leads to a value greater than $2^{26}$-1, the changes in the values of the bits B26-B63 will not be reflected in the TWT element. As a result, using conventional procedure, the recovered TSF timer at the STA will be a value in the past.

This may be generalized to describe a scenario whenever the partial TSF transmitted in a frame carries up to bit K of the relevant TSF timer. In this case, changes from bit K+1 to B63 (highest bit/most significant bit (MSB)) of the TSF are not reflected at the receiver if the frame that carries the partial TSF time is received at a time that has Bits K+1 to B63 of the TSF that are different from the indicated time in the corresponding field (e.g., TWT subfield) of the frame carrying the partial TSF.

Aspects of the present disclosure, however, provide various solutions to encode and decode the partial TSF signaling which may help address the resolution and potential decoding issues described above.

According to a first approach to partial TSF encoding issues, additional processing may be performed at the STA side to recover the intended TSF timer by the transmitter.

For example, a STA receiving a frame that includes a partial representation of a target time value that is based on a portion of a current TSF value associated with when the frame was obtained may adjust the portion of the current TSF value, if a recovered value for the target time value represents a time in the past. The STA may then recover the target time value based on the partial representation of the target time value and the adjusted portion of the current TSF value.

In general, whenever the STA decodes the TSF timer of the next TWT and determines that the determined value is in the past, the STA may increment the value of the TSF indicated by the higher bits (B63-B26) by 1. The STA may then add to that the value indicated by the Target Wake Time subfield (B25-B10).

One potential advantage to this approach, involving additional processing at the STA, is that it may be implemented relatively efficiently. Another potential advantage is that it may not impact the frame size. In other words, this approach may avoid unnecessarily increasing the beacon size, in case of TWT, which may be used to signal up to 32 possible Broadcast/Restricted TWT schedules on each link.

According to a second approach to partial TSF encoding issues, the signaling may be redefined. For example, the TWT field may be redesigned to indicate the full TSF time (8 octets). This approach may involve an additional element or a redesign of an existing element, in order to allow legacy STAs (e.g., 11 ax) to be able to decode for B-TWT or other features. The element may include one or more B-TWT parameter sets (e.g., with a length field for future extensions), each having B-TWT ID and full TWT (e.g., 8 octets) to signal the full TSF timer of the Next TWT and one/two octets of channel field for SST operation. One candidate to use as such an element may be the TWT Parameter Constraints element.

Another potential issue with TWT signaling is when the APs attempts to schedule a next TWT very close to a current TSF. For example, if the AP queues the beacon at 100 ms, then the AP may compute the Next TWT at 101 ms and attempt to set the TWT field accordingly. In this case, there could be a scenario where the beacon frame is held in the queue for few ms. As a result, the client may recover a Next TWT that occurs in the past (e.g., a few milliseconds before). This issue may occur, for example, when the information is coming from the beacon itself and is not based on a negotiation of the TWT SP. This may apply, for example, for R-TWT STAs that are not members of a schedule (e.g., a R-TWT schedule indicated in the beacon).

Aspects of the present disclosure may help address this issue by having an AP set a value in a field to indicate a next target wakeup time (TWT), based on a channel access time. In some cases, a rule may be adopted to ensure that the channel access time is considered (e.g., an AP may consider a buffer time e.g., 20 ms) when setting the next TWT. In some cases, an AP may skip (at least) one TWT SP in the schedule and set the TWT field based on the next TWT SP, if the transmission time of the beacon frame that carries the TWT element exceeds the first TWT SP start time.

As noted above, partial TSF encoding also presents a potential issue regarding TWT field granularity, because the TWT field does not signal lower 10 bits of the TSF timer (B0-B9), which are assumed be zero. As a result, the STA/AP can only specify a Target Wake Time with a resolution of 1024 microseconds, which is equivalent to one time unit (1 TU) in 802.11. Unfortunately, this limitation may prevent the alignment of the R-TWT schedule with latency sensitive traffic, based on the previously described rule of how the AP sets the TWT field, which may result in increased latency.

Figure 7:
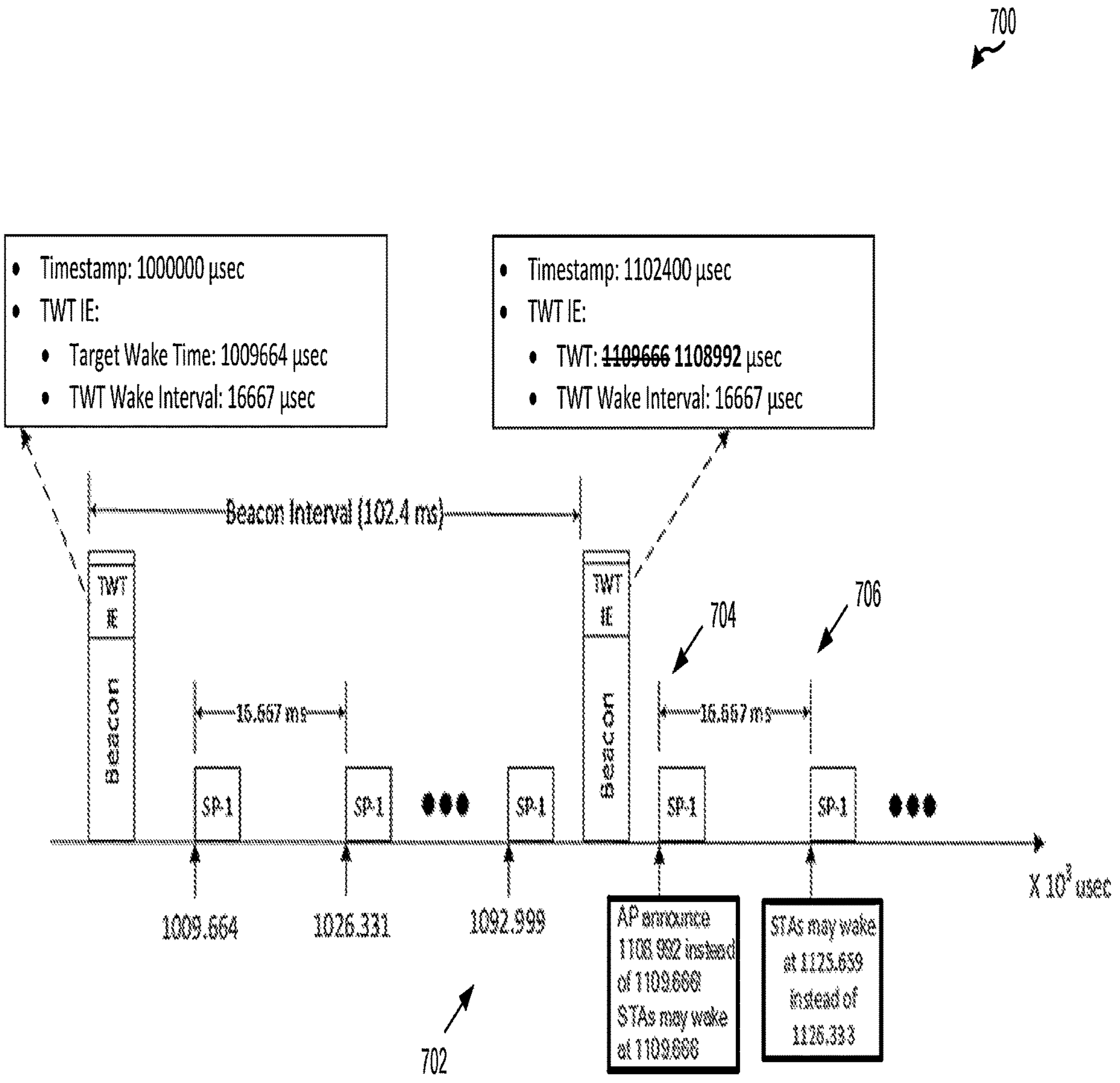
FIG. 7 depicts an example of a mismatch between a station wakeup time for a next TWT and an intended TWT announced by an access point (AP).

FIG. 7 illustrates a timeline 600 that demonstrates an example of this potential problem, where a STA may wake up at a different time, if the TWT Wake Interval is not a multiple of 1024, because TWT field does not carry resolution less than 1024 microseconds. In the illustrated example, the AP sends a beacon with a timestamp of 1102400 us. As illustrated, the AP announce a TWT start time of 1108992 us (1083 TUs) 704. Unfortunately, as illustrated, the STA may wake at 11099666 us 704, instead, which is 166667 us from start time of 1092999 us of a previous TWT 702, as it may not be able to process the beacon in time. Further, the STA may also wake at 1125659 for the subsequent TWT 706, rather than 1126.333 ms as intended by the AP.

According to certain aspects, the AP and STA may become aligned without additional signaling, by applying an algorithm that considers whether a target beacon transmission time (TBTT) occurs between a current TWT and a next TWT. In generally, a STA may calculate a next target wakeup time (TWT) based on TWT subfield and a TWT wake interval. In some cases, the next TWT may be computed based on the current TWT of the last SP. In other cases, the next TWT may be computed based on a TWT and a TWT Wake Interval in the first TWT parameters of a TWT agreement. The STA may then adjust the next TWT if a target beacon transmission time (TBTT) occurs between the current TWT and the calculated next TWT. For example, the adjusting may involve rounding the start time of the next TWT to the next TU (1024 us). In some cases, the AP may not announce the TWT field for several beacon intervals or TBTTs. In such cases, the AP may use a special value of the TWT field (e.g., all 1's or all 0's) that is identified by the STA as an indication to compute the Next TWT based on previous received TWT field value.

Figure 8:
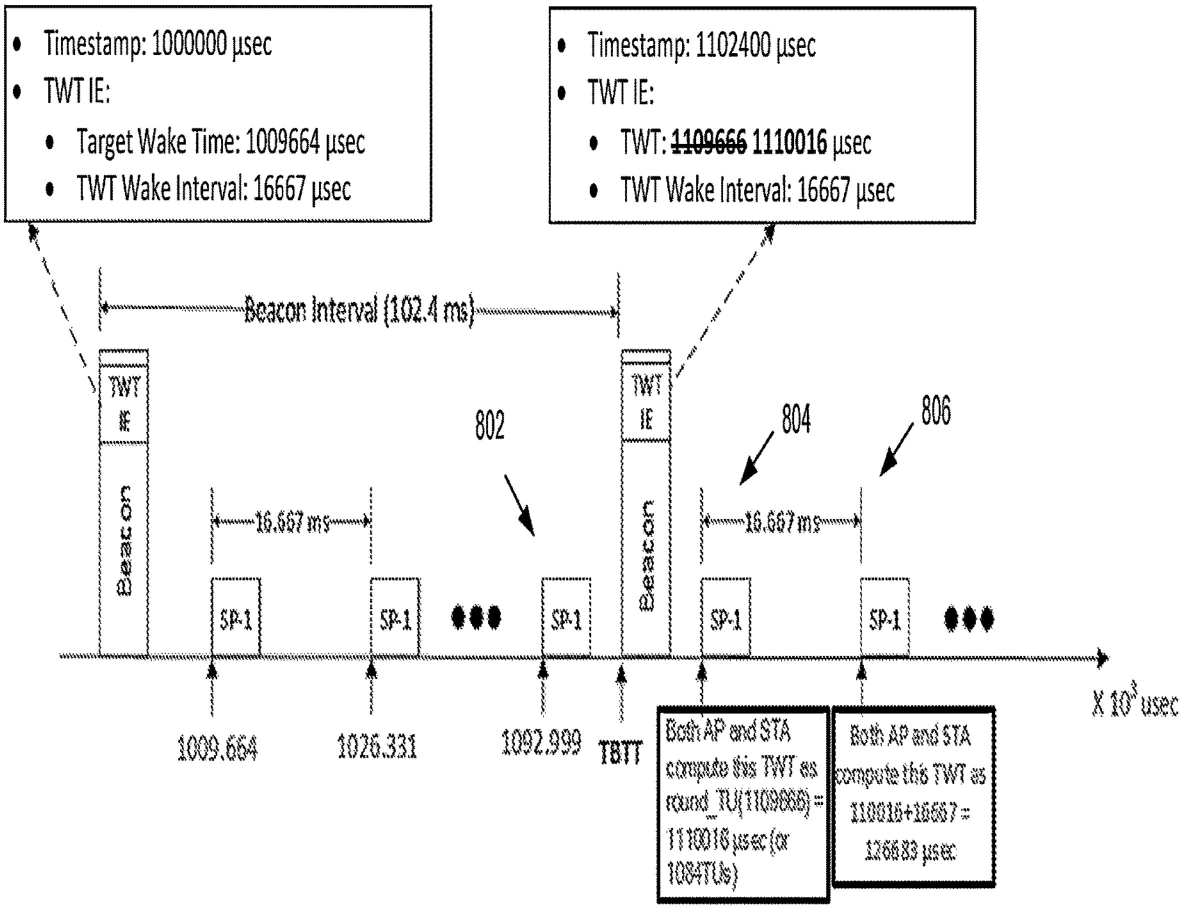
FIG. 8 depicts an example of how an access point (AP) and station may align regarding a wakeup time for a next TWT, in accordance with aspects of the present disclosure.

An example of this rounding is illustrated in the example timeline 800 of FIG. 8. Assuming the TWT wake interval is less than the TBTT interval, the algorithm may be described as follows. The AP announces a TWT (e.g., a B-R/TWT or a Coordinated TWT/R-TWT) parameter set in the beacon (possibly after TWT setup with STA). The AP and a STA that receives the TWT element (e.g., in the beacon), both may determine the Next TWT field, based on the next TBTT, as follows:

If (TSF timer of next TWT<Next TBTT):
 TSF_Timer [Next TWT]=TSF_Timer[Current TWT]+TWT Wake Interval (microseconds)
Else
 TSF_Timer[Next TWT]=Round_To_Nearest_TU(TSF_Timer[Current TWT]+TWT Wake Interval (microseconds)).

According to certain aspects, the TSF Timer of the current TWT may be computed based on the original TWT parameter set, such that there is no increasing offset every beacon interval.

According to certain aspects, an R-TWT scheduling AP may set a TWT field in the TWT element that it transmits, based on the R-TWT parameter set in the TWT setup frame and may adjust (e.g., rounding to the nearest TU value) the TSF Timer corresponding to the Next TWT. Similarly, an R-TWT scheduled STA may compute the next TWT based on the Target Wake Time subfield and the TWT Wake Interval in the last received TWT element and by adjusting the TSF Timer corresponding for the Next TWT (e.g., by rounding to the nearest TU). One example is as follows:

TSF Timer [Next TWT]=TSF Timer corresponding to the last received TWT field (e.g., in the beacon frame)+round(TWT Wake Interval*k), where k is an integer number of TWT Wake intervals until the next TWT.

In the example illustrated in FIG. 8, because a TBTT occurs between a current TWT 802 starting at 1092.999 ms and a next TWT 804, both the STA and AP may round to the next TU. In this case, both the AP and STA may compute there TWT to be 1110016 (or 1084 TUs). For the subsequent TWT 806, however, both the AP and STA may compute the start time based on the value indicated in the beacon (e.g., 1110016+16667=126683 us) as there is no TWT between TWT 804 and TWT 806.

Using this approach, STAs and APs may wake at the same start time, even when the TWT wake interval is in microseconds. The impact of rounding when processing XR traffic may be understood with reference to timelines 900A and 900B of FIG. 9A and FIG. 9B. The figures show example offset in microseconds (Y-axis) for different R-TWT service period (SP) counts. The examples assume a 16.667 ms period of arrival of XR traffic, such that, in most cases 6 SPs occur within a 102.4 ms beacon interval (with 7 SPs occurring occasionally).

Figure 9A:
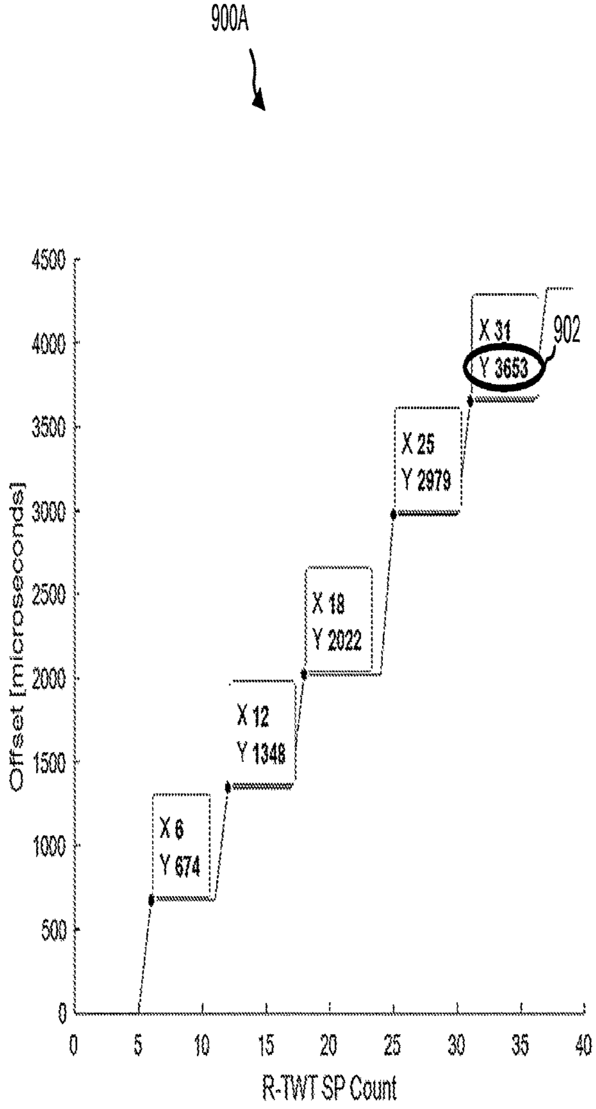
FIGS. 9A and 9B depict an example of how rounding to a nearest time unit (TU), in accordance with certain aspects of the present disclosure, may impact TWT service period (SP) offsets.
Figure 9B:
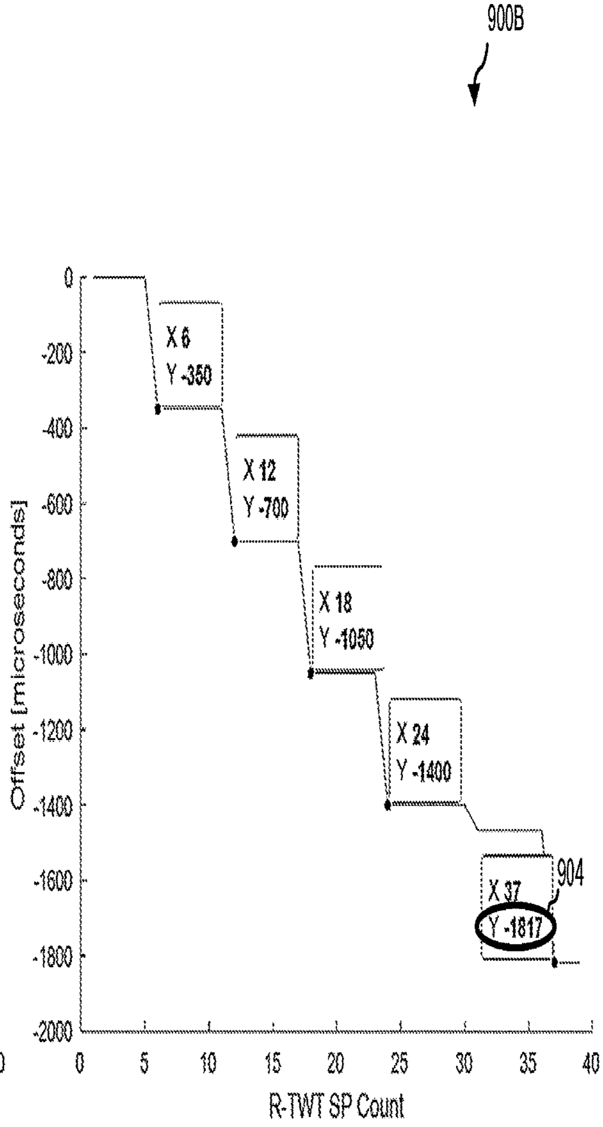

The examples assume that there is initially no offset between XR arrival time and the initial SPs. As illustrated in FIG. 9A, however, without rounding proposed herein, the offset effectively grows each beacon interval, ultimately reaching an offset of Y=3653 us, for SP count X=31, as shown at 902. As illustrated in FIG. 9B, however, using the rounding (e.g., to a next TU) proposed herein, the offset is effectively restrained, with the greatest magnitude occurring at an offset of Y=−1817 us, for SP count X=37, as shown at 904. Thus, the rounding may result in offsets with a magnitude of less than half that when compared to the conventional approach with no rounding. As a result, a greater number of SPs may be processed, which may help improve overall performance and reduce latency.

Example Operations of a Station

Figure 10:
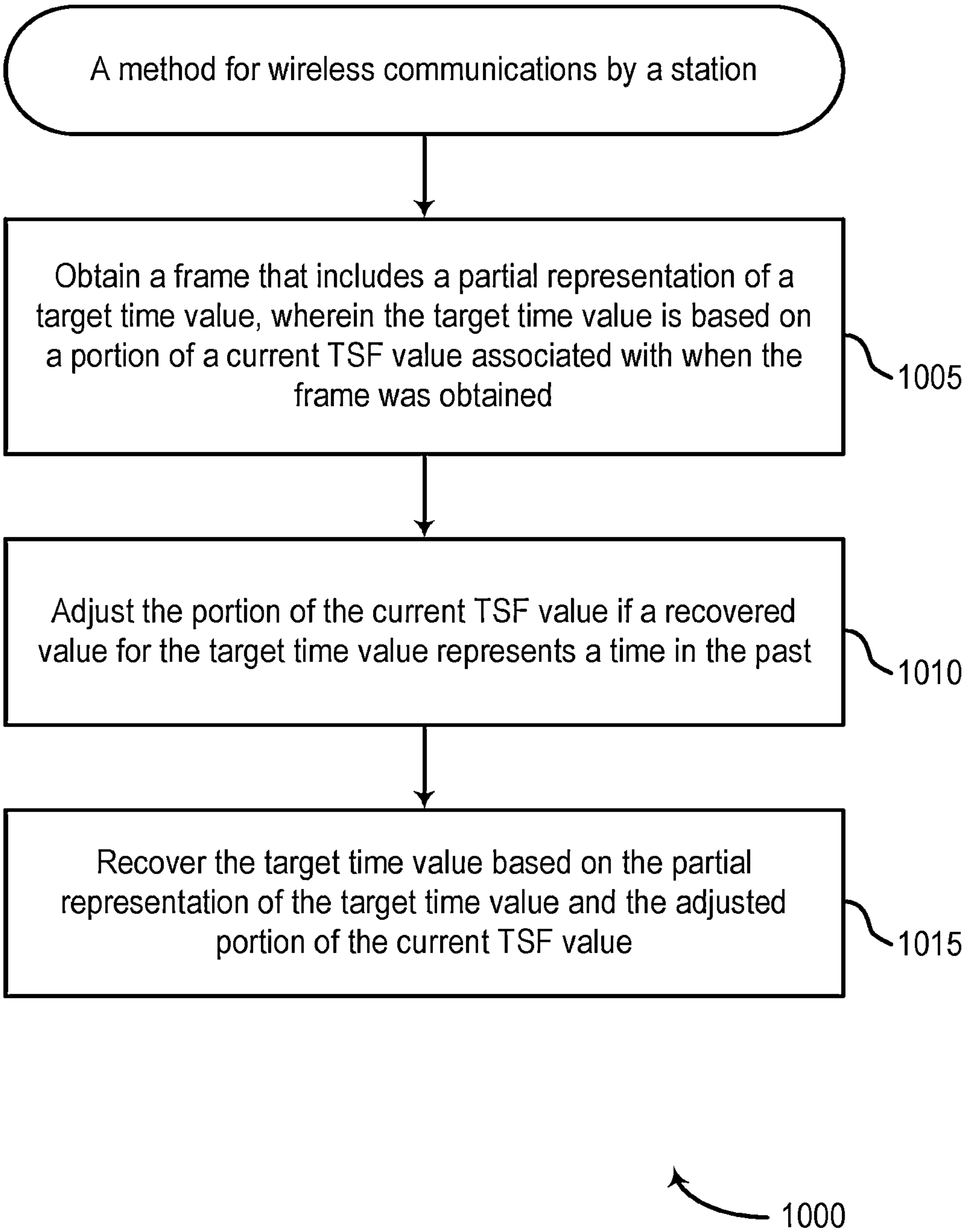
FIG. 10 depicts a method for wireless communications, in accordance with certain aspects of the present disclosure.

FIG. 10 shows an example of a method 1000 of wireless communication by a station, such as a STA 120 of FIGS. 1 and 2.

Method 1000 begins at step 1005 with obtaining a frame that includes a partial representation of a target time value, wherein the target time value is based on a portion of a current TSF value associated with when the frame was obtained. In some cases, the operations of this step refer to, or may be performed by, circuitry for obtaining and/or code for obtaining as described with reference to FIG. 14.

Method 1000 then proceeds to step 1010 with adjusting the portion of the current TSF value if a recovered value for the target time value represents a time in the past. In some cases, the operations of this step refer to, or may be performed by, circuitry for adjusting and/or code for adjusting as described with reference to FIG. 14.

Method 1000 then proceeds to step 1015 with recovering the target time value based on the partial representation of the target time value and the adjusted portion of the current TSF value. In some cases, the operations of this step refer to, or may be performed by, circuitry for recovering and/or code for recovering as described with reference to FIG. 14.

In some aspects, at least one of the frame comprises a TWT element or the target time value comprises a TWT.

In some aspects, the frame comprises a SCS frame.

In some aspects, the partial representation of the target time value comprises up to a bit position K of the target time value; and the portion of the TSF value associated with when the frame was obtained comprises bit positions of K+1 and higher, wherein the bit positions of K+1 and higher were not included in the frame.

In some aspects, adjusting the portion of the current TSF value comprises adjusting one or more of the bit positions of K+1 and higher.

Figure 14:
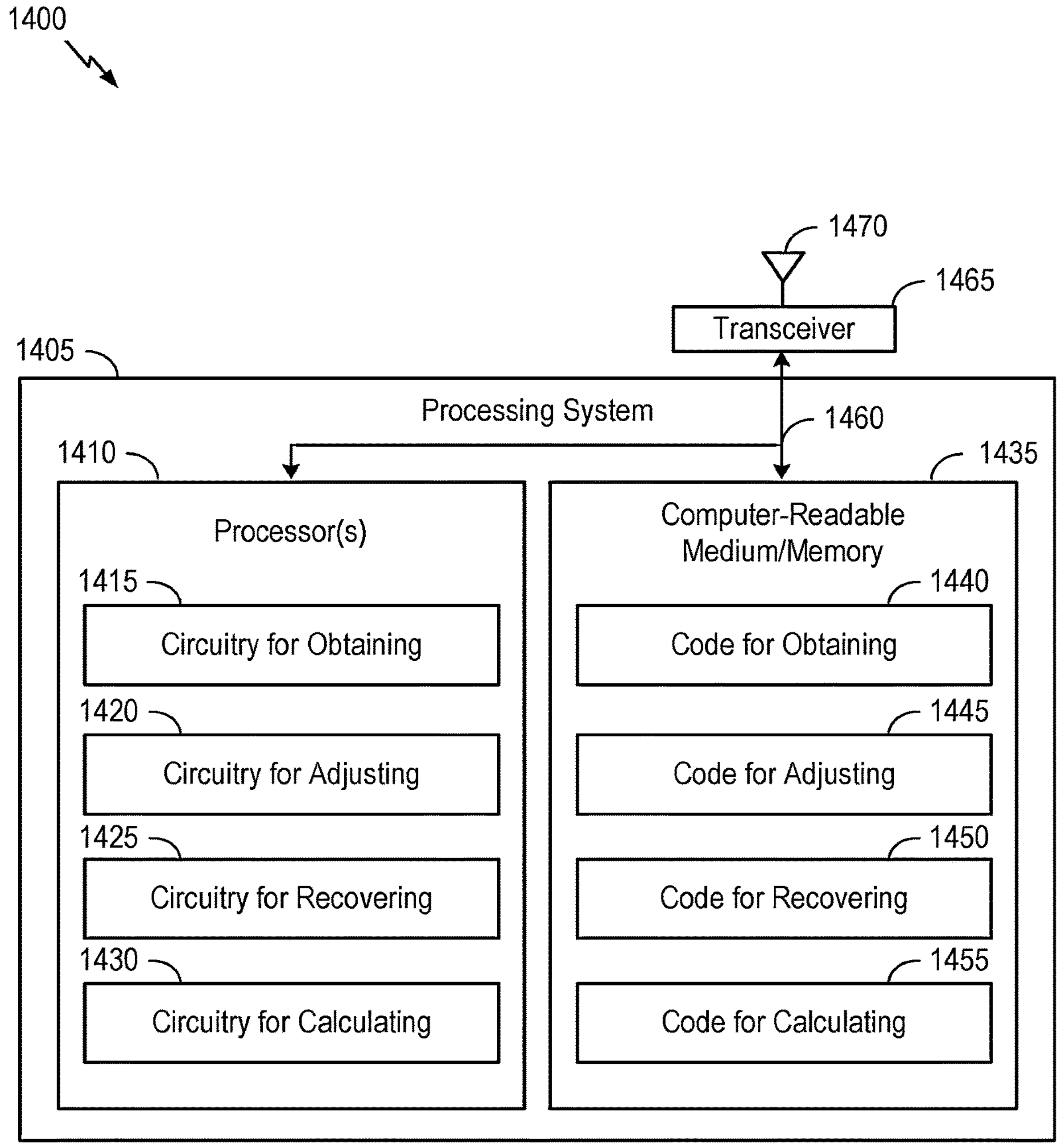
FIG. 14 depicts aspects of an example communications device, in accordance with certain aspects of the present disclosure.

In one aspect, method 1000, or any aspect related to it, may be performed by an apparatus, such as communications device 1400 of FIG. 14, which includes various components operable, configured, or adapted to perform the method 1000. Communications device 1400 is described below in further detail.

Note that FIG. 10 is just one example of a method, and other methods including fewer, additional, or alternative steps are possible consistent with this disclosure.

Figure 11:
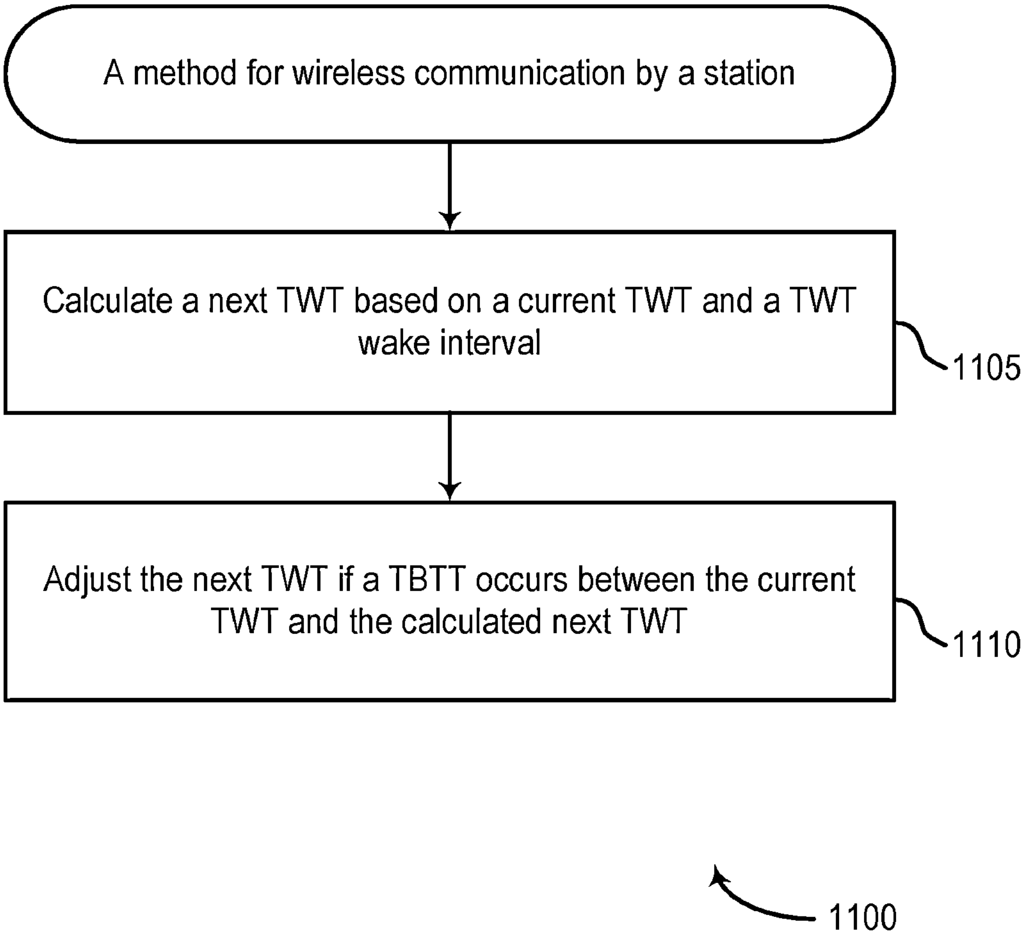
FIG. 11 depicts a method for wireless communications, in accordance with certain aspects of the present disclosure.

FIG. 11 shows an example of a method 1100 of wireless communication by a station, such as a STA 120 of FIGS. 1 and 2.

Method 1100 begins at step 1105 with calculating a next TWT based on a current TWT and a TWT wake interval. In some cases, the operations of this step refer to, or may be performed by, circuitry for calculating and/or code for calculating as described with reference to FIG. 14.

Method 1100 then proceeds to step 1110 with adjusting the next TWT if a TBTT occurs between the current TWT and the calculated next TWT. In some cases, the operations of this step refer to, or may be performed by, circuitry for adjusting and/or code for adjusting as described with reference to FIG. 14.

In some aspects, adjusting the next TWT comprises rounding the next TWT to a nearest TU.

In some aspects, the rounding comprises applying a floor function.

In some aspects, a TSF value of the adjusted next TWT is a multiple of the TU.

In some aspects, the method 1100 further includes obtaining a beacon indicating the TWT wake interval. In some cases, the operations of this step refer to, or may be performed by, circuitry for obtaining and/or code for obtaining as described with reference to FIG. 14.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Example Operations of an Access Point

Figure 12:
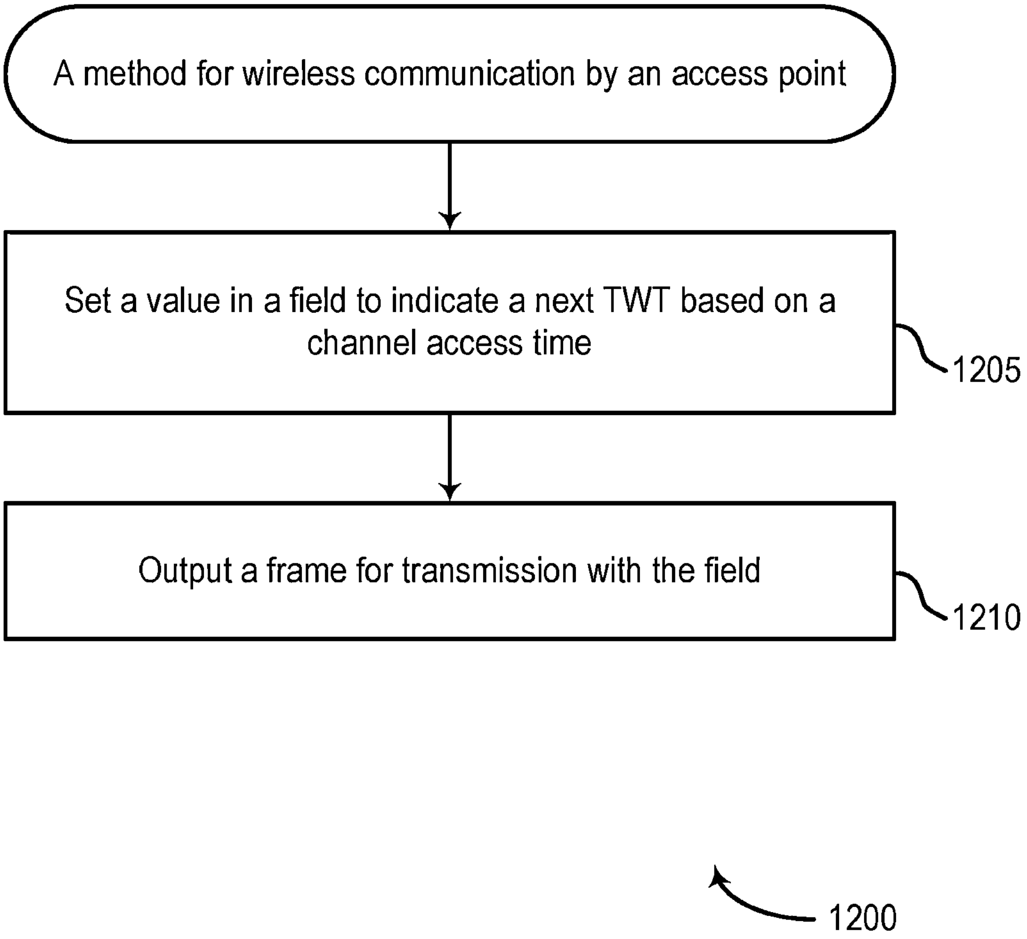
FIG. 12 depicts a method for wireless communications, in accordance with certain aspects of the present disclosure.

FIG. 12 shows an example of a method 1200 of wireless communication by an access point, such as an AP 110 of FIGS. 1 and 2.

Method 1200 begins at step 1205 with setting a value in a field to indicate a next TWT based on a channel access time. In some cases, the operations of this step refer to, or may be performed by, circuitry for setting and/or code for setting as described with reference to FIG. 15.

Method 1200 then proceeds to step 1210 with outputting a frame for transmission with the field. In some cases, the operations of this step refer to, or may be performed by, circuitry for outputting and/or code for outputting as described with reference to FIG. 15.

In some aspects, the frame comprises a beacon frame; and the field comprises a TWT field.

In some aspects, setting the value of the TWT field results in skipping a TWT in the schedule if a transmission time of the beacon frame exceeds a start time of a next TWT SP.

In some aspects, the next TWT is applicable to a station that is not scheduled with a SP corresponding to a TWT indicated in the TWT field.

In some aspects, the TWT is applicable to at least one of a restricted TWT station that is not scheduled with an SP corresponding to a TWT indicated in the TWT field; or a broadcast TWT station that is not scheduled with an SP corresponding to a TWT indicated in the TWT field.

Figure 15:
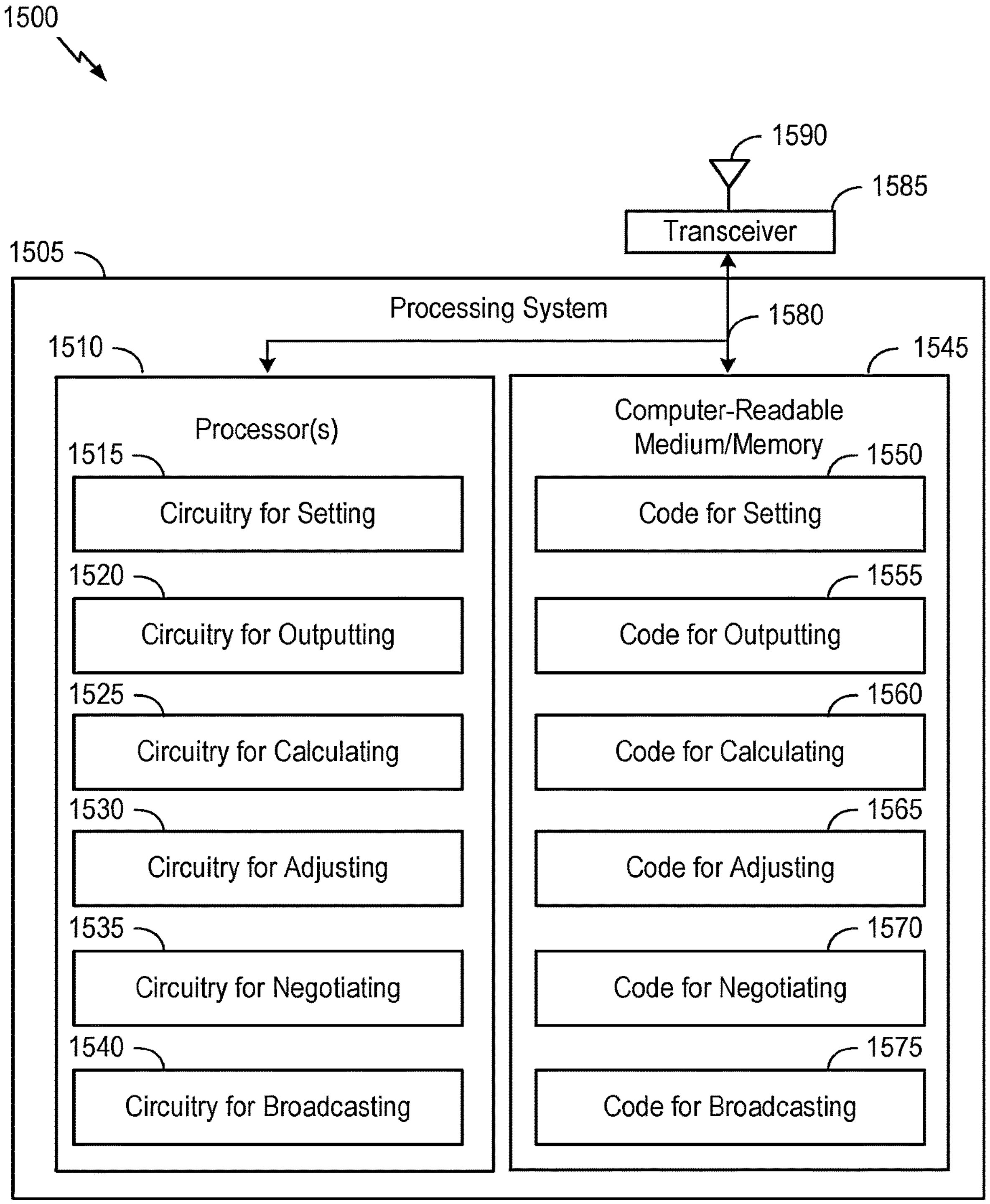
FIG. 15 depicts aspects of an example communications device, in accordance with certain aspects of the present disclosure.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Figure 13:
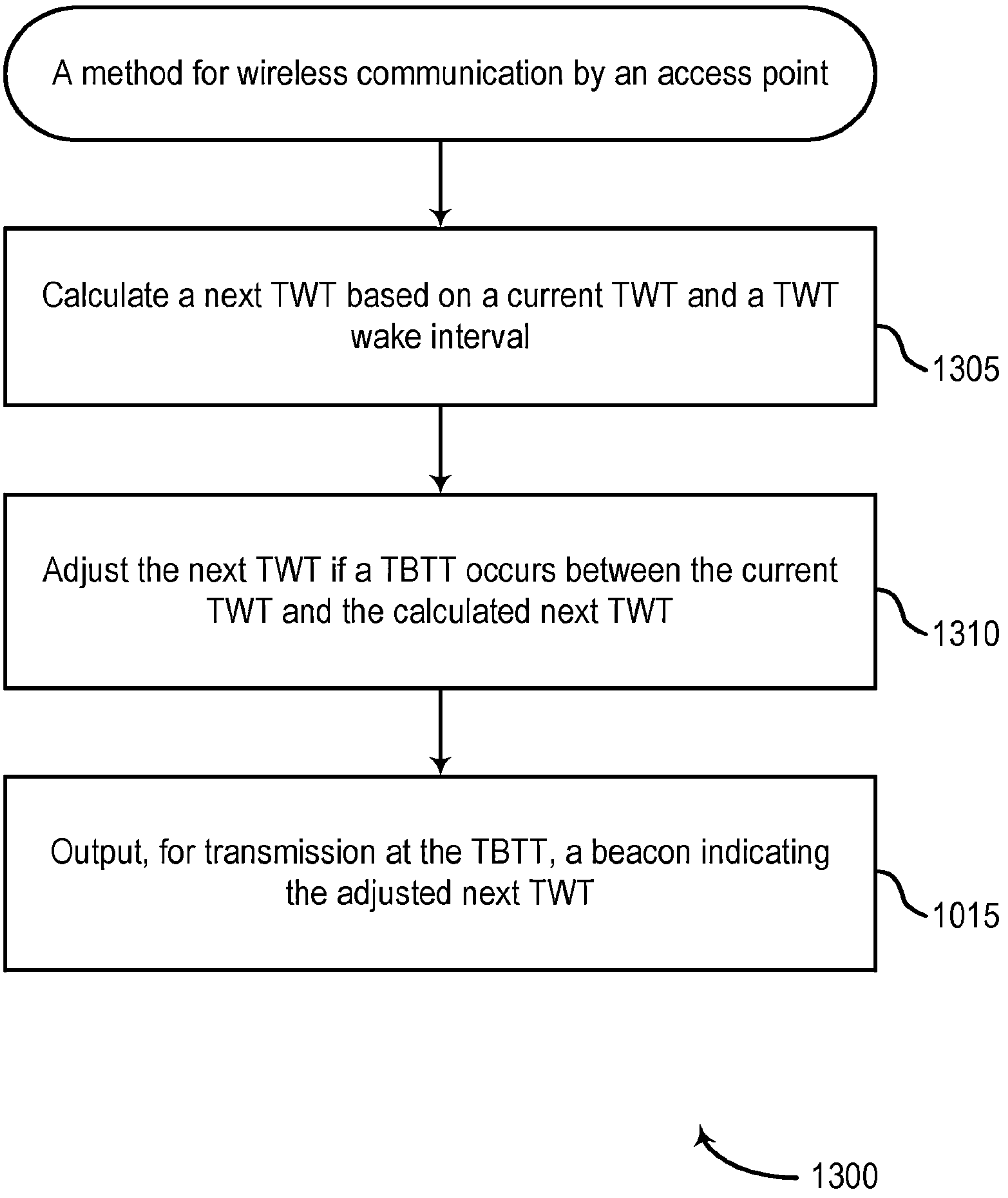
FIG. 13 depicts a method for wireless communications, in accordance with certain aspects of the present disclosure.

FIG. 13 shows an example of a method 1300 of wireless communication by an access point, such as an AP 110 of FIGS. 1 and 2.

Method 1300 begins at step 1305 with calculating a next TWT based on a current TWT and a TWT wake interval. In some cases, the operations of this step refer to, or may be performed by, circuitry for calculating and/or code for calculating as described with reference to FIG. 15.

Method 1300 then proceeds to step 1310 with adjusting the next TWT if a TBTT occurs between the current TWT and the calculated next TWT. In some cases, the operations of this step refer to, or may be performed by, circuitry for adjusting and/or code for adjusting as described with reference to FIG. 15.

Method 1300 then proceeds to step 1315 with outputting, for transmission at the TBTT, a beacon indicating the adjusted next TWT. In some cases, the operations of this step refer to, or may be performed by, circuitry for outputting and/or code for outputting as described with reference to FIG. 15.

In some aspects, adjusting the next TWT comprises rounding the next TWT to a nearest TU.

In some aspects, the rounding comprises applying a floor function.

In some aspects, a TSF value of the adjusted next TWT is a multiple of the TU.

In some aspects, adjusting the next TWT comprises adjusting the next TWT at at least one of the TBTT or another TBTT.

In some aspects, the other TBTT comprises a TBTT configured for a DTIM transmission.

In some aspects, the method 1300 further includes negotiating, with a station, the adjustment of the next TWT, wherein adjusting the next TWT is based on the negotiation. In some cases, the operations of this step refer to, or may be performed by, circuitry for negotiating and/or code for negotiating as described with reference to FIG. 15.

In some aspects, the method 1300 further includes broadcasting the adjustment of the next TWT in one or more broadcast frames. In some cases, the operations of this step refer to, or may be performed by, circuitry for broadcasting and/or code for broadcasting as described with reference to FIG. 15.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a station, such as a STA 120 described above with respect to FIGS. 1 and 2.

The communications device 1400 includes a processing system 1405 coupled to the transceiver 1465 (e.g., a transmitter and/or a receiver). The transceiver 1465 is configured to transmit and receive signals for the communications device 1400 via the antenna 1470, such as the various signals as described herein. Transceiver 1465 may be an example of aspects of the transceiver 254 described with reference to FIG. 2. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of the RX data processor 270, the TX data processor 288, the TX spatial processor 290, or the controller 280 of STA 120 illustrated in FIG. 2. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform: the method 1000 described with respect to FIG. 10, or any aspect related to it; and the method 1100 described with respect to FIG. 11, or any aspect related to it. Note that reference to a processor performing a function of communications device 1400 may include one or more processors 1410 performing that function of communications device 1400.

In the depicted example, computer-readable medium/memory 1435 stores code (e.g., executable instructions), such as code for obtaining 1440, code for adjusting 1445, code for recovering 1450, and code for calculating 1455. Processing of the code for obtaining 1440, code for adjusting 1445, code for recovering 1450, and code for calculating 1455 may cause the communications device 1400 to perform: the method 1000 described with respect to FIG. 10, or any aspect related to it; and the method 1100 described with respect to FIG. 11, or any aspect related to it.

The one or more processors 1410 include circuitry configured to implement (e.g., execute) the code stored in the computer-readable medium/memory 1435, including circuitry such as circuitry for obtaining 1415, circuitry for adjusting 1420, circuitry for recovering 1425, and circuitry for calculating 1430. Processing with circuitry for obtaining 1415, circuitry for adjusting 1420, circuitry for recovering 1425, and circuitry for calculating 1430 may cause the communications device 1400 to perform: the method 1000 described with respect to FIG. 10, or any aspect related to it; and the method 1100 described with respect to FIG. 11, or any aspect related to it.

Various components of the communications device 1400 may provide means for performing: the method 1000 described with respect to FIG. 10, or any aspect related to it; and the method 1100 described with respect to FIG. 11, or any aspect related to it. For example, means for transmitting, sending or outputting for transmission may include the transmitter unit 254 or antenna(s) 252 of the STA 120 illustrated in FIG. 2 and/or the transceiver 1465 and the antenna 1470 of the communications device 1400 in FIG. 14. Means for receiving or obtaining may include the receiver unit 254 or antenna(s) 252 of STA 120 illustrated in FIG. 2 and/or the transceiver 1465 and the antenna 1470 of the communications device 1400 in FIG. 14.

FIG. 15 depicts aspects of an example communications device 1500. In some aspects, communications device 1500 is an access point, such as an AP 110 described above with respect to FIGS. 1 and 2.

The communications device 1500 includes a processing system 1505 coupled to the transceiver 1585 (e.g., a transmitter and/or a receiver). The transceiver 1585 is configured to transmit and receive signals for the communications device 1500 via the antenna 1590, such as the various signals as described herein. Transceiver 1585 may be an example of aspects of the transceiver 254 described with reference to FIG. 2. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of RX data processor 242, the TX data processor 210, the TX spatial processor 220, or the controller 230 of AP 110 illustrated in FIG. 2. The one or more processors 1510 are coupled to a computer-readable medium/memory 1545 via a bus 1580. In certain aspects, the computer-readable medium/memory 1545 is configured to store instructions (e.g., computer-executable code) that when executed by the one or more processors 1510, cause the one or more processors 1510 to perform: the method 1200 described with respect to FIG. 12, or any aspect related to it; and the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1545 stores code (e.g., executable instructions), such as code for setting 1550, code for outputting 1555, code for calculating 1560, code for adjusting 1565, code for negotiating 1570, and code for broadcasting 1757. Processing of the code for setting 1550, code for outputting 1555, code for calculating 1560, code for adjusting 1565, code for negotiating 1570, and code for broadcasting 1757 may cause the communications device 1500 to perform: the method 1200 described with respect to FIG. 12, or any aspect related to it; and the method 1300 described with respect to FIG. 13, or any aspect related to it.

The one or more processors 1510 include circuitry configured to implement (e.g., execute) the code stored in the computer-readable medium/memory 1545, including circuitry such as circuitry for setting 1515, circuitry for outputting 1520, circuitry for calculating 1525, circuitry for adjusting 1530, circuitry for negotiating 1535, and circuitry for broadcasting 1540. Processing with circuitry for setting 1515, circuitry for outputting 1520, circuitry for calculating 1525, circuitry for adjusting 1530, circuitry for negotiating 1535, and circuitry for broadcasting 1540 may cause the communications device 1500 to perform: the method 1200 described with respect to FIG. 12, or any aspect related to it; and the method 1300 described with respect to FIG. 13, or any aspect related to it.

Various components of the communications device 1500 may provide means for performing: the method 1200 described with respect to FIG. 12, or any aspect related to it; and the method 1300 described with respect to FIG. 13, or any aspect related to it. For example, means for transmitting, sending or outputting for transmission may include the transmitter unit 222 or an antenna(s) 224 of AP 110 illustrated in FIG. 2 and/or the transceiver 1585 and the antenna 1590 of the communications device 1500 in FIG. 15. Means for receiving or obtaining may include the receiver unit 222 or an antenna(s) 224 of AP 110 illustrated in FIG. 2 and/or the transceiver 1585 and the antenna 1590 of the communications device 1500 in FIG. 15. Means for communicating may include the transmitter/receiver unit 222 or an antenna (s) 224 of AP 110 illustrated in FIG. 2 and/or the transceiver 1585 and the antenna 1590 of the communications device 1500 in FIG. 15. In some aspects, means for obtaining, means for adjusting, means for recovering, means for setting, and/or means for calculating may include one or more of the processors illustrated in FIG. 2.

EXAMPLE CLAUSES

Implementation examples are described in the following numbered clauses:

Clause 1: A method for wireless communication by a station, comprising: obtaining a frame that includes a partial representation of a target time value, wherein the target time value is based on a portion of a current TSF value associated with when the frame was obtained; adjusting the portion of the current TSF value if a recovered value for the target time value represents a time in the past; and recovering the target time value based on the partial representation of the target time value and the adjusted portion of the current TSF value.

Clause 2: The method of Clause 1, wherein at least one of the frame comprises a TWT element or the target time value comprises a TWT.

Clause 3: The method of any one of Clauses 1 and 2, wherein the frame comprises a SCS frame.

Clause 4: The method of any one of Clauses 1-3, wherein: the partial representation of the target time value comprises up to a bit position K of the target time value; and the portion of the TSF value associated with when the frame was obtained comprises bit positions of K+1 and higher, wherein the bit positions of K+1 and higher were not included in the frame.

Clause 5: The method of Clause 4, wherein adjusting the portion of the current TSF value comprises adjusting one or more of the bit positions of K+1 and higher.

Clause 6: A method for wireless communication by an access point, comprising: setting a value in a field to indicate a next TWT based on a channel access time; and outputting a frame for transmission with the field.

Clause 7: The method of Clause 6, wherein: the frame comprises a beacon frame; and the field comprises a TWT field.

Clause 8: The method of Clause 7, wherein setting the value of the TWT field results in skipping a TWT in the schedule if a transmission time of the beacon frame exceeds a start time of a next TWT SP.

Clause 9: The method of any one of Clauses 6-8, wherein the next TWT is applicable to a station that is not scheduled with a SP corresponding to a TWT indicated in the TWT field.

Clause 10: The method of Clause 9, wherein the TWT is applicable to at least one of a restricted TWT station that is not scheduled with an SP corresponding to a TWT indicated in the TWT field; or a broadcast TWT station that is not scheduled with an SP corresponding to a TWT indicated in the TWT field.

Clause 11: A method for wireless communication by a station, comprising: calculating a next TWT based on a current TWT and a TWT wake interval; and adjusting the next TWT if a TBTT occurs between the current TWT and the calculated next TWT.

Clause 12: The method of Clause 11, wherein adjusting the next TWT comprises rounding the next TWT to a nearest TU.

Clause 13: The method of Clause 12, wherein the rounding comprises applying a floor function.

Clause 14: The method of Clause 12, wherein a TSF value of the adjusted next TWT is a multiple of the TU.

Clause 15: The method of any one of Clauses 11-14, further comprising: obtaining a beacon indicating the TWT wake interval.

Clause 16: A method for wireless communication by an access point, comprising: calculating a next TWT based on a current TWT and a TWT wake interval; adjusting the next TWT if a TBTT occurs between the current TWT and the calculated next TWT; and outputting, for transmission at the TBTT, a beacon indicating the adjusted next TWT.

Clause 17: The method of Clause 16, wherein adjusting the next TWT comprises rounding the next TWT to a nearest TU.

Clause 18: The method of Clause 17, wherein the rounding comprises applying a floor function.

Clause 19: The method of Clause 17, wherein a TSF value of the adjusted next TWT is a multiple of the TU.

Clause 20: The method of any one of Clauses 16-19, wherein adjusting the next TWT comprises adjusting the next TWT at at least one of the TBTT or another TBTT.

Clause 21: The method of any one of Clauses 16-20, wherein the other TBTT comprises a TBTT configured for a DTIM transmission.

Clause 22: The method of any one of Clauses 16-21, further comprising: negotiating, with a station, the adjustment of the next TWT, wherein adjusting the next TWT is based on the negotiation.

Clause 23: The method of any one of Clauses 16-22, further comprising: broadcasting the adjustment of the next TWT in one or more broadcast frames.

Clause 24: An apparatus, comprising: a memory comprising executable instructions; and a processor configured to execute the executable instructions and cause the apparatus to perform a method in accordance with any one of Clauses 1-23.

Clause 25: An apparatus, comprising means for performing a method in accordance with any one of Clauses 1-23.

Clause 26: A non-transitory computer-readable medium comprising executable instructions that, when executed by a processor of an apparatus, cause the apparatus to perform a method in accordance with any one of Clauses 1-23.

Clause 27: A computer program product embodied on a computer-readable storage medium comprising code for performing a method in accordance with any one of Clauses 1-23.

Clause 28: A wireless station, comprising: at least one transceiver; a memory comprising instructions; and one or more processors configured to execute the instructions and cause the wireless station to perform a method in accordance with any one of Clauses 1-5, wherein the at least one transceiver is configured to receive the frame.

Clause 29: An access point, comprising: at least one transceiver; a memory comprising instructions; and one or more processors configured to execute the instructions and cause the access point to perform a method in accordance with any one of Clauses 6-10, wherein the at least one transceiver is configured to transmit the signal.

Clause 30: A wireless station, comprising: at least one transceiver; a memory comprising instructions; and one or more processors configured to execute the instructions and cause the wireless station to perform a method in accordance with any one of Clauses 11-15, wherein the at least one transceiver is configured to receive a frame at the next TWT.

Clause 31: An access point, comprising: at least one transceiver; a memory comprising instructions; and one or more processors configured to execute the instructions and cause the access point to perform a method in accordance with any one of Clauses 16-23, wherein the at least one transceiver is configured to transmit the signal.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
at least one memory comprising processor-executable instructions; and
one or more processors, individually or collectively, configured to execute the processor-executable instructions to cause the apparatus to:
calculate a next target wakeup time (TWT) based on a current TWT and a TWT wake interval;
adjust the next TWT if a target beacon transmission time (TBTT) occurs between the current TWT and the next TWT; and
transmit at the TBTT and via the at least one transceiver, a beacon indicating the adjusted next TWT.

2. The apparatus of claim 1, wherein, to adjust the next TWT, the one or more processors, individually or collectively, are configured to cause the apparatus to round the next TWT to a nearest time unit (TU).

3. The apparatus of claim 2, wherein the one or more processors, individually or collectively, are configured to cause the apparatus to apply a floor function to round the next TWT.

4. The apparatus of claim 2, wherein a timer synchronization function (TSF) value of the adjusted next TWT is a multiple of the TU.

5. The apparatus of claim 1, wherein adjusting the next TWT comprises adjusting the next TWT at at least one of the TBTT or another TBTT.

6. The apparatus of claim 5, wherein the another TBTT comprises a TBTT configured for a delivery traffic indication message (DTIM) transmission.

7. The apparatus of claim 1, wherein the one or more processors, individually or collectively, are further configured to execute the processor-executable instructions to cause the apparatus to negotiate, with a station, the adjustment of the next TWT, wherein adjusting the next TWT is based on the negotiation.

8. The apparatus of claim 1, wherein the one or more processors, individually or collectively, are further configured to execute the processor-executable instructions to cause the apparatus to broadcast the adjustment of the next TWT in one or more broadcast frames.

9. The apparatus of claim 1, wherein the apparatus is configured to operate as an access point.

10. A method for wireless communication, comprising:
calculating a next target wakeup time (TWT) based on a current TWT and a TWT wake interval;
adjusting the next TWT if a target beacon transmission time (TBTT) occurs between the current TWT and the next TWT; and
transmitting at the TBTT, a beacon indicating the adjusted next TWT.

11. The method of claim 10, wherein adjusting the next TWT comprises rounding the next TWT to a nearest time unit (TU).

12. The method of claim 11, wherein the rounding comprises applying a floor function.

13. The method of claim 11, wherein a timer synchronization function (TSF) value of the adjusted next TWT is a multiple of the TU.

14. The method of claim 10, wherein adjusting the next TWT comprises adjusting the next TWT at at least one of the TBTT or another TBTT.

15. The method of claim 14, wherein the another TBTT comprises a TBTT configured for a delivery traffic indication message (DTIM) transmission.

16. The method of claim 10, further comprising negotiating, with a station, the adjustment of the next TWT, wherein adjusting the next TWT is based on the negotiation.

17. The method of claim 10, further comprising broadcasting the adjustment of the next TWT in one or more broadcast frames.

18. An apparatus for wireless communication, comprising:
means for calculating a next target wakeup time (TWT) based on a current TWT and a TWT wake interval;
means for adjusting the next TWT if a target beacon transmission time (TBTT) occurs between the current TWT and the next TWT; and
means for transmitting at the TBTT, a beacon indicating the adjusted next TWT.

19. A non-transitory computer-readable medium having instructions stored thereon, that when executed by one or more processors of an access point, cause the access point to:
calculate a next target wakeup time (TWT) based on a current TWT and a TWT wake interval;
adjust the next TWT if a target beacon transmission time (TBTT) occurs between the current TWT and the next TWT; and
transmit at the TBTT and via at least one transceiver of the access point, a beacon indicating the adjusted next TWT.

* * * * *